United States Patent [19]

Ofek et al.

[11] Patent Number: 5,297,137
[45] Date of Patent: Mar. 22, 1994

[54] PROCESS FOR ROUTING DATA PACKETS AROUND A MULTI-NODE COMMUNICATIONS NETWORK

[75] Inventors: Yoram Ofek, Riverdale; Marcel M. Yung, New York, both of N.Y.

[73] Assignee: International Business Machines Corporation, Armonk, N.Y.

[21] Appl. No.: 647,765

[22] Filed: Jan. 30, 1991

[51] Int. Cl.$^5$ ............................................. H04L 12/56
[52] U.S. Cl. .................... 370/60; 370/85.15; 370/94.1
[58] Field of Search ............... 370/94.1, 94.3, 85.15, 370/85.12, 85.5, 85.6, 60, 54; 340/825.05, 60.1, 94.2

[56] References Cited

U.S. PATENT DOCUMENTS

| | | | |
|---|---|---|---|
| 4,380,063 | 4/1983 | Janson et al. | 370/60 |
| 4,733,391 | 3/1988 | Godbold et al. | 370/85.12 |
| 4,766,590 | 8/1988 | Hamada et al. | 370/85.15 |
| 4,864,560 | 9/1989 | Quinquis et al. | 370/60 |
| 4,884,263 | 11/1989 | Suzuki | 370/16 |
| 4,899,334 | 2/1990 | Shimizu | 370/60 |
| 4,901,309 | 2/1990 | Turner | 370/60 |
| 4,905,231 | 2/1990 | Leung et al. | 370/94.1 |
| 4,920,484 | 4/1990 | Ranade | 364/200 |
| 4,939,718 | 7/1990 | Serval et al. | 370/94.1 |
| 5,084,870 | 1/1992 | Huehinson et al. | 370/94.1 |
| 5,111,198 | 5/1992 | Kuszmaul | 370/94.1 |

*Primary Examiner*—Douglas W. Olms
*Assistant Examiner*—Hassan Kizou
*Attorney, Agent, or Firm*—Scully, Scott, Murphy & Presser

[57] ABSTRACT

A dynamic technique for routing data packets between entry and destination nodes of a multi-node communication network of arbitrary topology In accordance with this technique, the nodes of the network are connected together by a multitude of links, and a subset of these links form a virtual ring embedded in the network and traversing each node thereof at least once. The nodes route each data packet to a destination node without requiring any data from the data packet other than data identifying the destination node of the data packet. Also, the nodes route each data packet to its destination node such that the distance, along the virtual ring, between the data packet and its destination node always decrease. Data packets in the virtual embedded ring have priority to continue to be routed on the ring. As a result, lossless routing with a single buffer per each input link is provided. The objective of the routing function of every intermediate node is to try to decrease the distance to the destination as much as possible.

21 Claims, 8 Drawing Sheets

IL – INPUT LINK
OL – OUTPUT LINK

PACKET WITH NO CONTROL SIGNAL

PACKET WITH A CONTROL SIGNAL

PROCESS FOR ROUTING DATA PACKETS AROUND A MULTI-NODE COMMUNICATIONS NETWORK

BACKGROUND OF THE INVENTION

This invention generally relates to a communications network, and more specifically, to a technique for transmitting data packets on a multi-node communications network having an arbitrary topology.

Various techniques or procedures are known for routing data packets over a multi-node communications network; and more specifically, for routing each packet from an entry node to a destination node. These prior art techniques all tend to suffer from one or more disadvantages, however. For instance, some of these techniques require that a considerable amount of data be stored in a processor memory at each node of the network Other routing procedures require that each packet itself identify a complete path for transmitting the packet from the entry node to the destination node. Still other routing techniques require that each node be provided with information about events occurring over the entire network.

The difficulties associated with these disadvantages are particularly significant when the network is a high-speed communications network, which is a new environment made possible by recent advances in transmission technology. The environment of a high-speed communications network normally requires that the nodes of the network operate quickly based solely on local information; and to accomplish this, the network nodes require properties that are very different than those existing in current architectures and algorithms designed for traditional large area networks.

SUMMARY OF THE INVENTION

An object of this invention is to provide a technique for the dynamic, self-routing of data packets in a communications network of an arbitrary topology, and that is very well suited for use with a high speed communications network.

Another object of the present invention is to route data packets around a multi-node communications network, from an entry node to a destination node, in a manner that does not require a data packet itself to contain all of the information needed to identify a destination node.

A further object of this invention is to provide a communications network in which a multitude of nodes are connected together by a multitude of full-duplex links, where each node dynamically routes data packets from a plurality of input links to a plurality of output links and which requires only a single data buffer per input link.

Still another object of the present invention is to provide a routing process for routing data packets around a multi-node communication network, which ensures that data packets are not lost in the network due either to a collision with another packet at a switch of a node or due to an overflow at an input buffer of a node.

These and other objectives are attained with a dynamic technique for routing data packets between entry and destination nodes of a multi-node communication network of arbitrary topology. In accordance with this technique, the nodes of the network are connected together by means of a multitude of links, and a subset of these links form a virtual ring embedded in the network and traversing each node thereof at least once. The nodes route each data packet to a destination node without requiring any data from the data packet other than data identifying the destination node of the data packet. Also, the nodes route each data packet to its destination node such that the distance along the virtual ring, between the data packet and its destination mode always decreases.

Each node has at least one pair of input and output ring links; and at each node, each pair of input and output ring links forms a virtual node. At least some of the nodes include a plurality of virtual nodes; and at these nodes, data packets arriving at one of the virtual nodes may be selectively transmitted onto another of the virtual nodes, thereby short-cutting across the node to reduce the number of ring links traversed by the data packets between their entry and destination nodes. This may be done by numbering the virtual nodes of the network in sequence in a given direction around the embedded virtual ring; and, when a data packet arrives at a given node, determining the virtual node of the given node closest in the numbered sequence to any one of the virtual nodes of the destination node of the data packet, and then switching the data packet to that determined virtual node.

Another subset of the links form thread links that provide additional interconnections between the nodes. At nodes that are connected to thread links, data packets arriving at the nodes are transmitted onto selected output links, either ring links or thread links, so as to reduce the total number of ring and thread links traversed by the data packets between the entry and destination nodes thereof With the disclosed technique, each input link of each node includes one buffer capable of holding, at most, one maximum size data packet.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
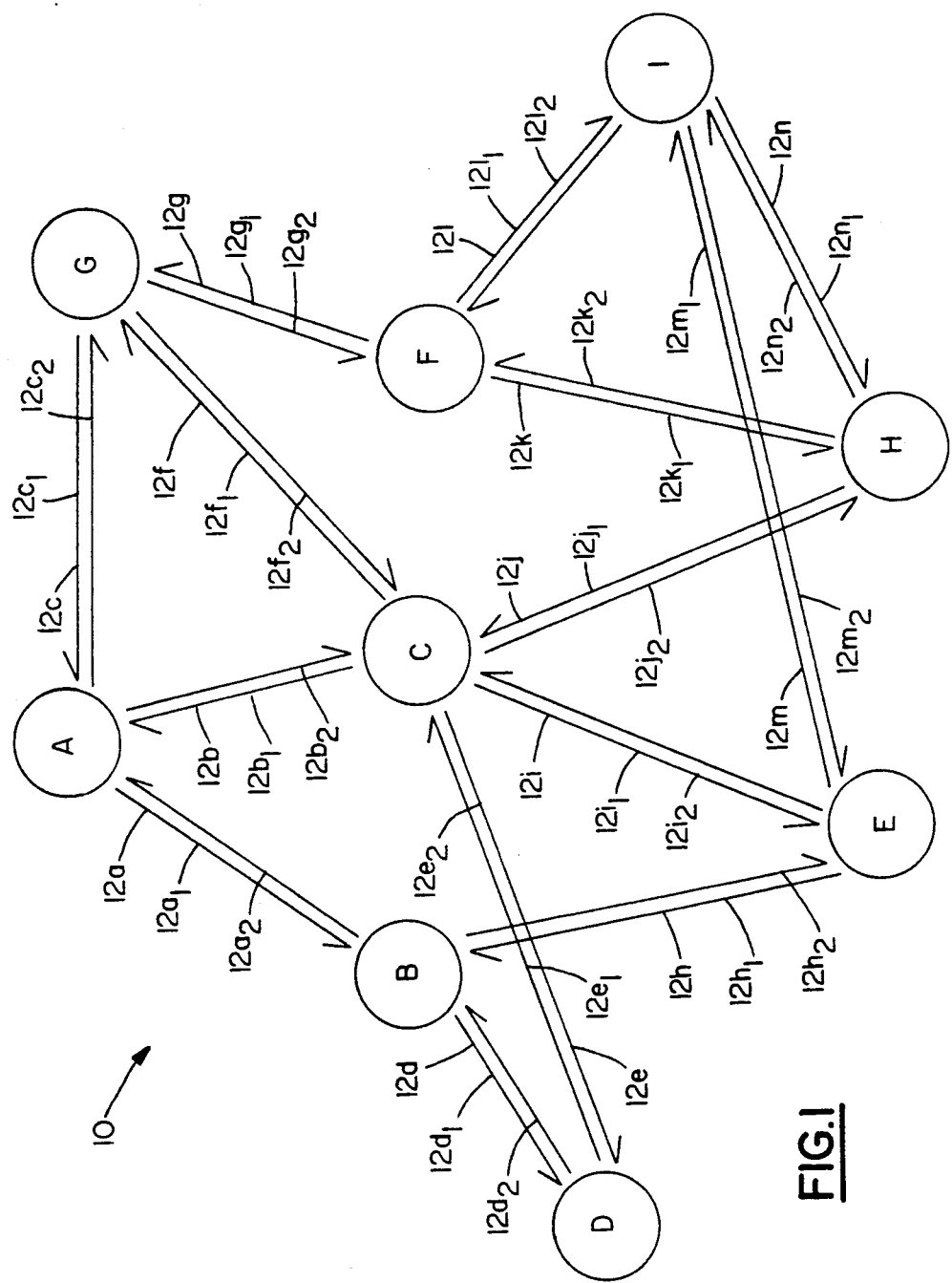
FIG. 1 is a schematic illustration of a full-duplex communications network.

FIG. 1 shows communication network 10 comprising a multitude of switching entities or nodes A-I and a multitude of communication links 12a-12n. Generally, the nodes of the network provide access to the network for users; and more specifically, each node is connected to a respective one user to transmit data packets between that user and the network. The communication links of the network interconnect the nodes of the network and transmit data packets and other signals between those nodes; and in particular, each link of the network connects together two nodes of the network. Preferably, each link of network 10, in fact, comprises a pair of unidirectional links or link segments, and each link segment of each link is identified by the same reference number as the link itself but with an added subscript "1" or "2." Each link 12a-12n, or each pair of link segments, can be realized by a single communication medium, such as an optical fiber, or by two separate communication mediums, such as a pair of coaxial cables or optical fibers.

Figure 2:
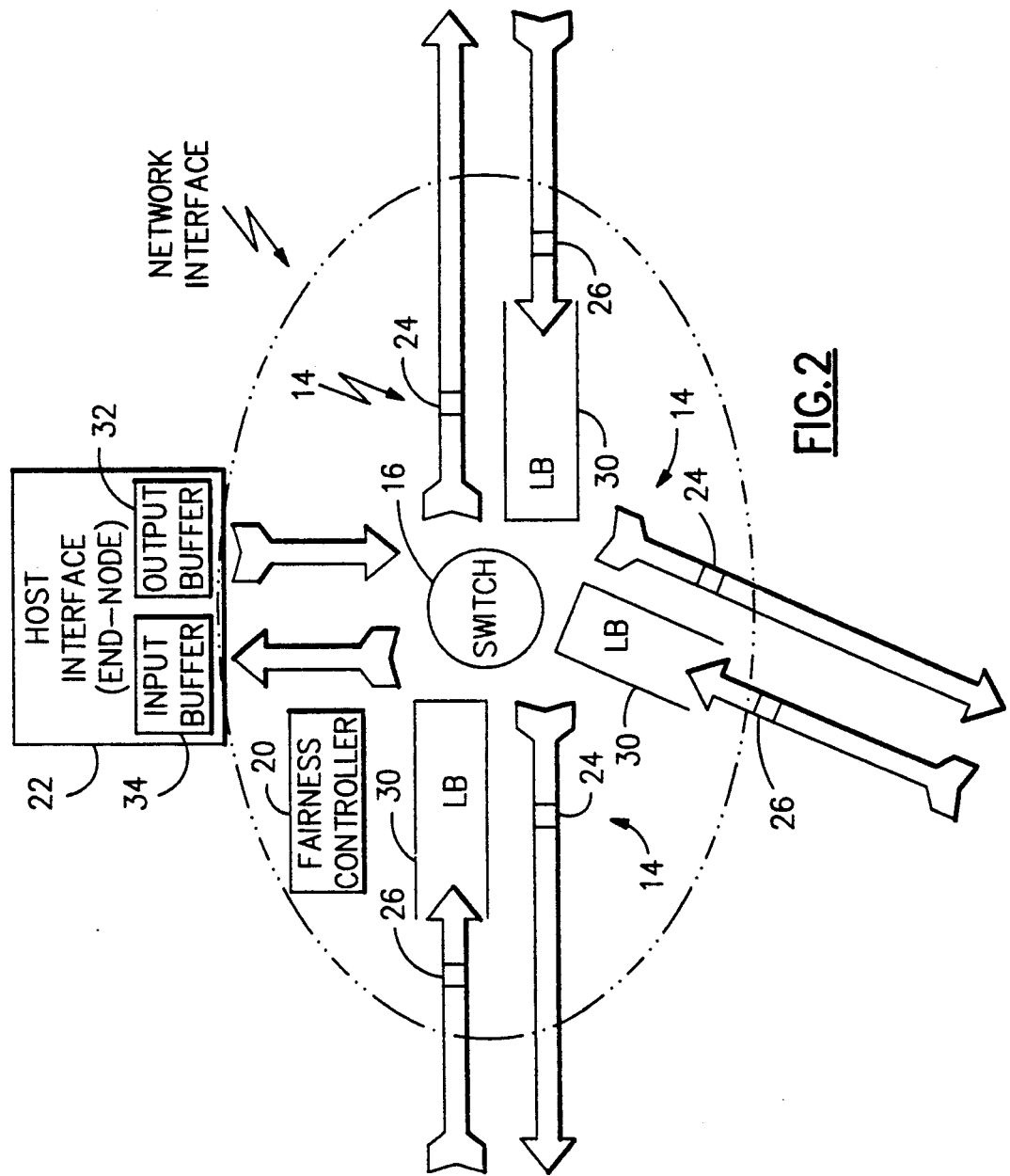
FIG. 2 schematically illustrates the basic structure of the nodes of the network shown in FIG. 1.

The nodes of network 10 are substantially identical, and thus only one will be described herein in detail. FIG. 2 shows node A in greater detail; and with reference to this Figure, each node includes one or more full-duplex ports 14, a switch 16, a fairness controller 20, and a host interface 22. Each port is connected to a respective one full-duplex link. On the output or transmitting side of each link, there is a transmitter 24; and on the input or receiving side of each of the links, there is a receiver 26 and a link buffer 30 which can store one maximum size data packet. The switch 16 is part of the network interface and it can transfer data packets from the link buffers to the host interface or to the outgoing links, and the switch can transfer data packets from the host interface to the outgoing links. The fairness controller 20 is provided to implement a fairness algorithm that controls access to network 10. Suitable fairness algorithms are known in the art, and any such algorithm may be used with network 10. One suitable algorithm, for example, is disclosed in copending patent application No. 647,767, filed Jan. 30, 1991, filed for a Communication Network and a Method of Regulating the Transmission of Data Packets in a Communication Network, the disclosure of which is herein incorporated by reference.

The host interface, as shown in FIG. 2, connects the network interface with the outside world, which is referred to as the end-node; and the host interface includes one or more output buffers 32 and one or more input buffers 34. The output buffers are provided to receive and hold data packets to be transmitted to or entered into the network from the end node, and the input buffers are provided to receive and hold data packets to be transmitted to the end node from the network. When the node has a data packet to transmit to or enter into the network, the node puts that packet in the output buffer and then determines over which output link the packet should be sent. If that output link is available, the data packet is then sent to that link via the node switch. When a data packet being transmitted over the network arrives at a node that is the final destination node for that packet, the packet is then sent to the input buffer of the host interface of the node via the node switch.

Figure 3:
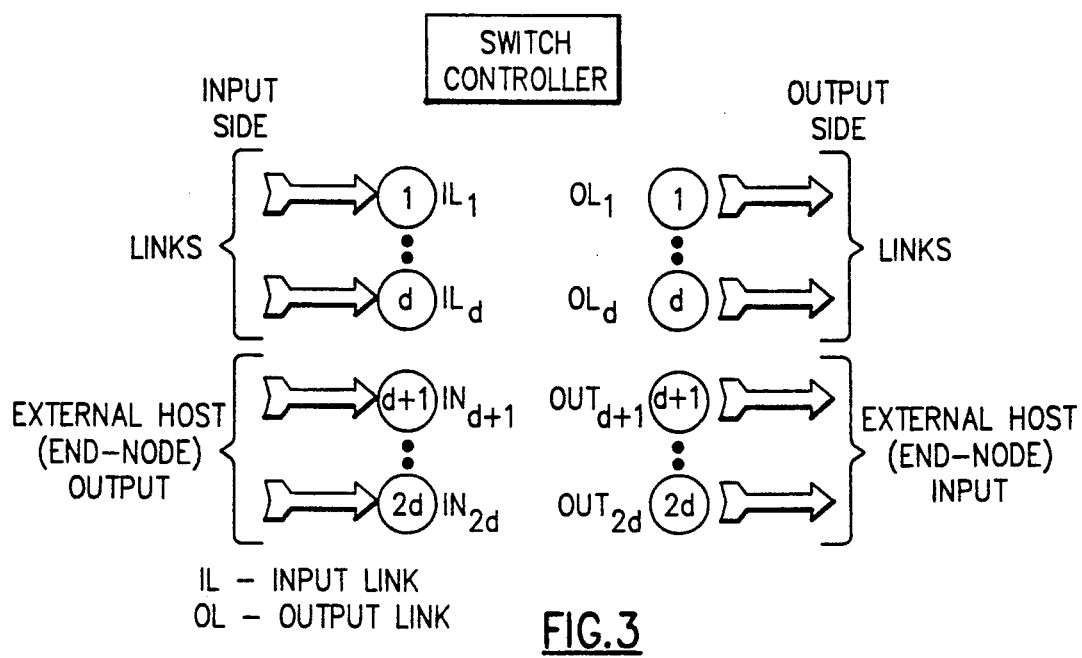
FIG. 3 is a diagram showing the functions of the switch controller of the nodes of the network.

FIG. 3 illustrates the functions performed by the switch node; and with reference to this Figure, preferably the switch has the following attributes. First, an output link can receive only one data packet at a time. As a result of this, if a first data packet is being transmitted to a particular output link and a second data packet arrives at the node for transmission to that particular output link, then that second data packet will be stored in a buffer until the transmission of the first data packet over the particular output link is completed. For example, if this second data packet is transmitted to the node over one of the input links to the node, that data packet is stored in a link buffer of that input link.

Second, if a data packet arrives at a node for transmission over a particular output link while no other data packet is currently being transmitted over that link —that is, the link is not busy or is idle— the node will begin to transmit the arriving data packet over that output link before the entire data packet has arrived at the node; i.e., the packet will "cut-through" the switch from the input link to the output link. Third, the switch can simultaneously forward multiple data packets to the host interface, specifically the input buffer thereof; and the host interface is able to send simultaneously several data packets from the output buffer of the host interface to different output links via the switch. Fourth, preferably, the size or amount of data that can be transmitted through the switch at any one time is greater than the sum of the sizes or amounts of data which the individual input links of the node are able to transmit to the switch; and thus, the switch can transmit data from, or service, all of the node input links at one time.

In addition, preferably, the rate at which the switch transmits data to an output link is the same as the rate at which each input link transmits data to the switch —a property referred to as balanced input/output transmission rates. This property significantly simplifies the design and implementation of the link interface. Most existing network nodes do not have this property, and the rate at which data can be transferred via the node switch into the output side of a link is often much greater (for example, ten times or more greater) than the rate at which data can be transmitted over the individual links. As a result, these existing link interface designs can be very complex, especially for very high-speed links such as those that transmit data at a rate on the order of magnitude of gigabits/second.

With reference again to FIGS. 1 and 2, each full-duplex link is considered as two directed links; and under normal operating conditions, data and control signals are transmitted in both directions over each full-duplex link. For a link to be operational, it is necessary that both directions be operational —that is, it is necessary that the link be able to transmit data and signals in both directions. This is because the preferred programs or algorithms, discussed below, for routing and controlling the flow of data around the networks and for controlling access to the network, require that data be transmitted in both directions over the network links. Thus, in case a link is not able to properly transmit data in one direction, the link is declared or considered to be faulty in that direction and in the other direction.

Figure 4:
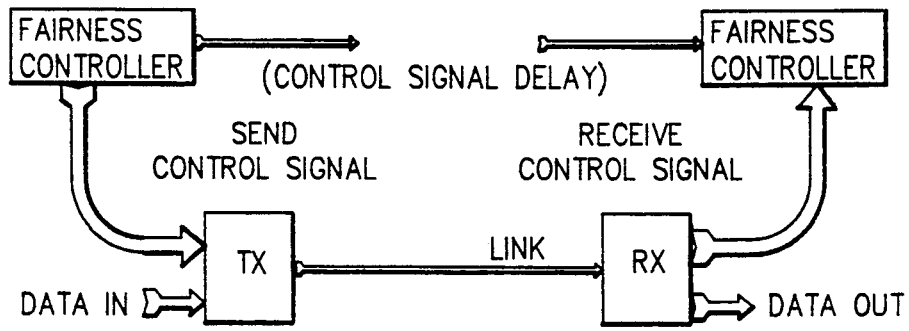
FIG. 4 generally illustrates the manner in which control signals may be transmitted between nodes of the network of FIG. 1.
Figure 5:
FIGS. 5 and 6 schematically illustrate data packets that may be transmitted over the networks of FIGS. 1 and 2, with the packet of FIG. 6 also including a control signal.

The transmission of data over the links of a network, referred to as traffic over the links, is regulated and controlled by mechanisms that use hardware messages or control signals. With reference to FIG. 4, these control signals are transmitted between the fairness controllers of the nodes, and the control signals are transmitted over the same physical medium —the links of the network— as are the data packets. The transmission of the control signals is transparent to the data packets, however; that is, it does not affect the contents of the data packets. The control signals can consist of, or be realized by, redundant or unused serial code words. One way to implement the transmission of a distinct control word is by using one of the unused serial code words of any code used on the network. For example, one known code used in communication networks is referred to as the 4B/5B code, and in this encoding scheme, every four bits of data are transformed into a code word of five bits. The unused code words in this encoding scheme can be used for transmitting control information from one node to its neighbor. The same also applies to other codes that contain redundant or unused code words. When the control signals consist of these codes words, each control word is short and, with reference to FIGS. 5 and 6, can be sent in the middle of a data packet in a manner that does not damage the data packet in which it is included.

Preferably, the control signals are transmitted in the direction opposite to the direction of transmission of the data packets whose transmission is being controlled by the control signals. Thus, a control signal would be transmitted from one node to another node to control the transmission of data packets from the latter node to the former node.

Figure 7:
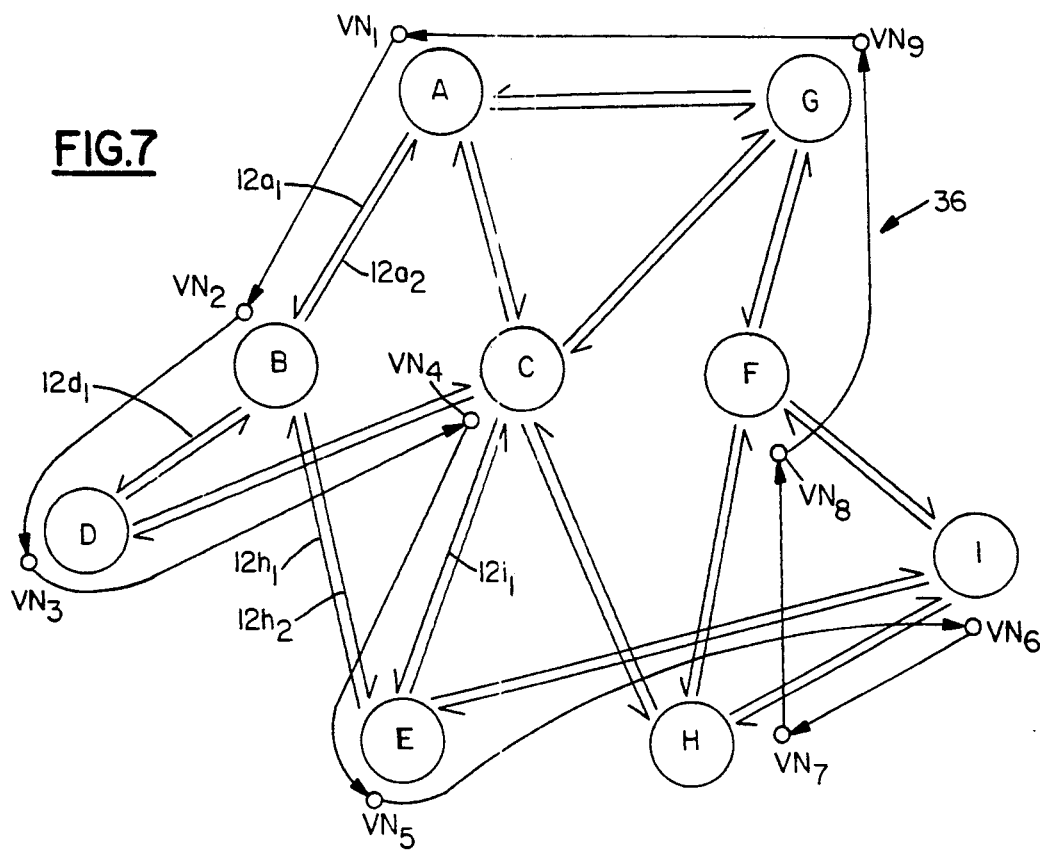
FIG. 7 shows a first virtual embedded ring structure that may be formed over the network of FIG. 1.
Figure 8:
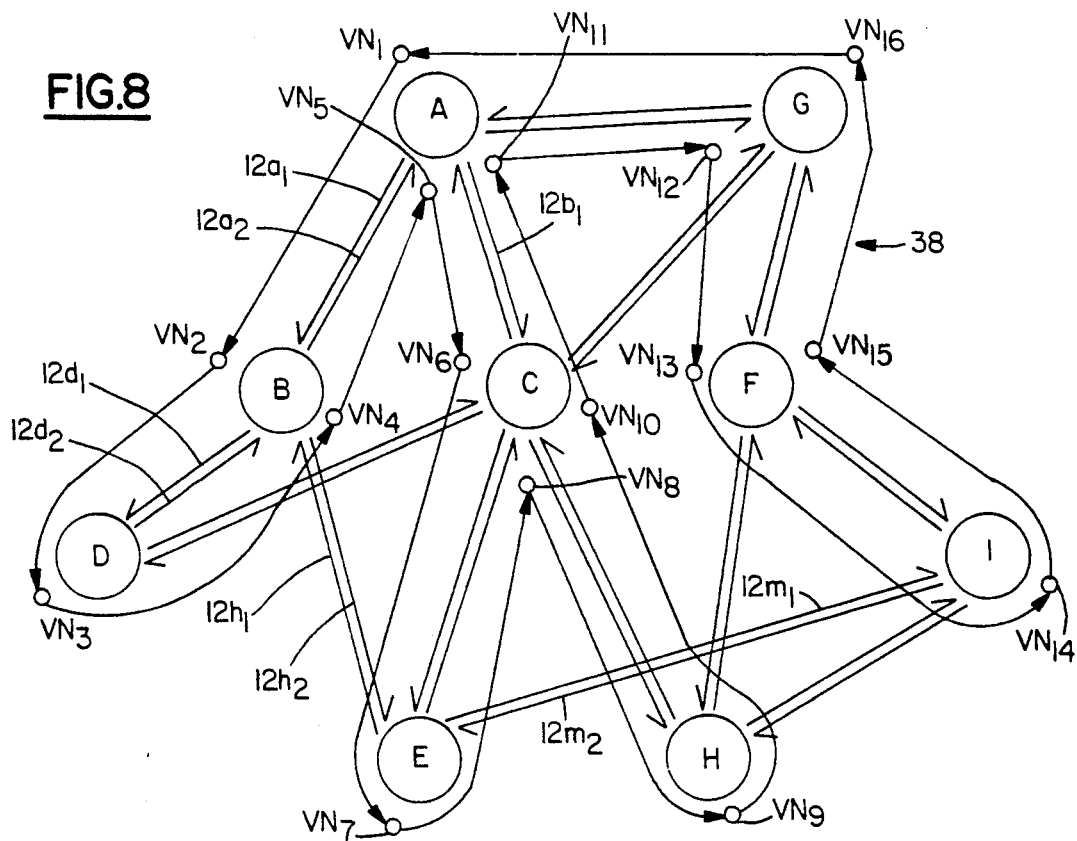
FIG. 8 shows a second virtual embedded ring structure that may be formed over the network of FIG. 1.

The nodes and links of network 10 may be used to form several unidirectional, virtual embedded ring structures extending completely around the network and traversing each node of the network at least once. For example, FIG. 7 illustrates one type of virtual embedded ring structure 36, referred to as a simple embedded ring. This structure is formed by traversing each of selected links of network 10 in one, and only one, direction and such that each node of the network is traversed once and only once. FIG. 8 schematically illustrates a second type of virtual embedded ring structure 38, referred to as a tree embedded ring. In this structure, each of selected links is traversed in one, or both, of the directions in which the link transmits data, and each node of the network is traversed once or more than once.

In both virtual embedded ring structures, each physical link segment that forms a part of the ring is also referred to as a virtual ring link, or a ring link, and those link segments that do not form part of the virtual ring are referred to as thread links. Thus, for instance, in FIG. 7, link segment $12a_1$ forms one ring link, link segment $12d_1$ forms another ring link, and link segment $12i_1$ forms still another ring link. At the same time, link segments $12a_2$, $12h_1$, and $12h_2$ are all considered as thread links. With reference to FIG. 8, link segments $12a_1$, $12a_2$, $12d_1$, $12b_1$, and $12d_2$, for example, form virtual links of virtual ring structure 38; and link segments $12h_1$, $12h_2$, $12m_1$, and $12m_2$, for example, are considered as thread links.

In addition to the foregoing, at each node of network 10, each pair of consecutive ring links that are connected to the node are considered as forming a connection referred to as a virtual node. Hence, for instance, in structure 36 links $12a_1$ and $12d_1$ form a virtual node $VN_2$, links $12g_1$ and $12k_1$ form a virtual node $VN_8$, and links $12i_1$ and $12m_1$ form a virtual node $VN_5$. Similarly, with reference to FIG. 8, in virtual structure 38, links $12b_1$ and $12i_1$ form virtual node $VN_6$, links $12g_1$ and $12c_1$ form virtual node $VN_{16}$, and links $12c_2$ and $12g_2$ form virtual node $VN_{12}$.

The virtual embedded ring structures 36 and 38 have the following attributes or characteristics. First, each embedded ring structure traverses each node of the network at least once. This characteristic is referred as global embedding, and it substantially facilitates routing data packets around or along the network. Second, each link segment is either a ring link or a thread link, but not both. As will be apparent from the discussion below, this characteristic helps to avoid deadlocks —situations in which each of a group of links is waiting for the other links of that group to transmit data packets. Third, each direction of a link —that is, each link segment— is embedded only once in a ring. Because of this, the embedded ring can traverse a ring link segment only once. This characteristic is preferred because otherwise each link segment may require more than one input buffer.

It should be noted that on any bidirectional connected network, it is possible to form at least one global embedded ring having all three of the above characteristics. This can be shown by finding a spanning tree over the network and traversing that tree in what is known as an Euler tour on a tree. In addition, on any bidirectional network with a Hamiltonian or pseudo-Hamiltonian circuit, it is possible to embed two global rings in opposite directions, each of which has all three of the characteristics discussed above.

In the discussion below, three types of names are used relating to the nodes of the virtual embedded ring structures 36 and 38: physical names, virtual names, and logical names. Each physical node has its own unique identification or physical name, denoted by a capital letter A, B, C ... I, as shown in FIGS. 7 and 8. Also, the virtual nodes of each embedded ring structure are identified by the letters VN and a unique numeric subscript. These subscripts may be assigned to the virtual nodes, for example, on the basis of the order of the virtual nodes in the embedded ring structure. The logical name of a node is the set of names of the virtual nodes of that physical node. For instance, in network 38 of FIG. 8, the logical name of node A is ($VN_1$, $VN_5$, $VN_{11}$), and the logical name of node G is ($VN_{12}$, $VN_{16}$). Preferably, in the logical name of a node, the virtual nodes are arranged with the numeric subscripts of those virtual nodes in an increasing order. The degree of a physical node is defined as the number of physical links connected to that physical node. Thus, for example, in network 10, node A has a degree of 3, node B has a degree of 3, and node C has a degree of 5.

Each ring link of the virtual embedded rings 36 and 38 connects together two virtual nodes; and in the discussion herein, individual ring links are identified by the symbol $RL_i$, where i is the numeric subscript of the virtual node connected to the input side of the ring link. Thus, for instance, with reference to FIG. 7, the ring link connecting virtual nodes $VN_1$ and $VN_2$ is identified as $RL_1$, and the ring link connecting virtual nodes $VN_8$ and $VN_9$ is identified as $RL_8$. Also, with reference to FIG. 8, the ring link connecting virtual nodes $VN_7$ and $VN_8$ is identified as $RL_7$, and the ring link connecting virtual nodes $VN_{15}$ and $VN_{16}$ is identified as $RL_{15}$.

As previously mentioned, the link or link segments of network 10 that are not part of a particular ring structure are considered, in relation to that particular ring structure, as thread links. Each thread link or link segments connects together two physical nodes; and in the discussion herein, individual thread links are identified by the combination of the logical names of the two physical nodes connected together by the thread link. Thus, for instance, with reference to ring structure 38 shown in FIG. 8, the thread link from node C to node G is identified by the name TL ($VN_6$, $VN_8$, $VN_{10}$) ($VN_{12}$, $VN_{16}$), and the thread link from node B to node E is identified by the name TL ($VN_2$, $VN_4$) ($VN_7$). In the name of each thread link, the logical name of the physical node that forms the input connection to the thread link is placed before the logical name of the physical node that forms the output connection of that thread link.

The simple embedded ring structure of FIG. 7 traverses each physical node of network 10 exactly once, and thus every physical node of this network has one virtual node. The tree embedded ring structure of FIG. 8 may traverse each physical node more than once, and thus every physical node of this network has one or more virtual nodes.

Access to the ring structure 36 of FIG. 7 is controlled by a procedure referred to as buffer insertion, which is a known, random, and distributed access technique to a unidirectional ring network. With buffer insertion, a node can start to transmit a data packet to a link from the output buffer of the host interface only as long as all link buffers of the node are empty. If a node is transmitting a data packet from the output buffer of the host interface to a link of the network when another data packet arrives at the node via one of the ring links of the network, the transmission of the former packet will continue until completed; and in the meantime, the latter packet will be stored in the link buffer of the link over which the packet arrives. Once the transmission of the packet from the host interface is completed, though, the node will then transmit the packet from the link buffer, and the node will not be able to transmit any more data from the host interface until all link buffers are again empty.

With this procedure, ring traffic —that is, the transmission of data at a node from one ring link to another ring link—has non-preemptive priority over node traffic that is to be entered into the ring —that is, data that is to be transmitted to a link from the output buffer of the host interface of or at that node. Clearly, the buffer insertion access mechanism allows the concurrent access, or spatial reuse, of the ring by more than one node; and since buffer insertion is always permitted, unless prevented by ring traffic, there is no degradation in its efficiency as the band width or physical size increases. The allowance of concurrent transmission to the network over the full-duplex ring does not guarantee that each node has a fair access to transmit packets to the network, however, since a first node can be prevented from transmitting data into the network if a second node continuously transmits data packets to the first node. In view of this, a procedure, referred to as a fairness procedure or a fairness algorithm, may be used to insure that each node of the network has at least a minimum opportunity to transmit packets into the network. As previously mentioned, any suitable fairness algorithm may be used with network 10, and one such algorithm is disclosed in copending application No. 647,767 filed Jan. 30, 1991, for "A Communication Network and A Method of Regulating the Transmission of Data Packets in a Communication Network," the disclosure of which is herein incorporated by reference.

As a further example, another fairness algorithm that may also be used on virtual rings 36 and 38 employs a control signal, referred to as SAT or a SAT signal. Generally, the SAT signal circulates around the embedded virtual ring structure; and in particular, each virtual node of the ring transmits the SAT signal to a neighboring virtual node after certain selected conditions, discussed below, are satisfied. Preferably, the SAT signal is circulated up-stream around the ring of the network —that is, each virtual node transmits the SAT signal to the neighboring virtual node having the smaller subscript, until the first virtual node in the ring is reached, and this first virtual node transmits the SAT signal to the last virtual node in the ring to start another SAT transmission cycle. For example, with this procedure, in the virtual embedded ring structure 36 of FIG. 7, virtual node $VN_3$, transmits the SAT signal to virtual node $VN_2$, which transmits the SAT signal to virtual $VN_1$, which in turn transmits the SAT signal to virtual node $VN_9$.

During each cycle of the SAT signal around the embedded ring, each virtual node can transmit or enter into the ring a predefined number of data packets, referred to as a transmission quota. Generally, when a given virtual node receives a SAT signal, it will promptly forward that control signal to the next virtual node in the SAT cycle if, since the last time the given node forwarded the SAT signal, that given node has transmitted into the network either (i) its transmission quota of packets or (ii) all of the data packets in the output buffer of the node at the time the given node forwarded that previous SAT signal. If either of these two conditions is met, the node is said to be satisfied; however, if neither of these two conditions is met, the node is said to be not satisfied.

When a not satisfied node receives a SAT signal, the node holds that SAT signal until the node becomes satisfied; and when this happens, the node then transmits the SAT signal to the next node in the SAT cycle around the embedded ring. After a node transmits the SAT signal, it can then introduce into the network a number of additional data packets up to the transmission quota provided for that node in the just received and transmitted SAT signal. The above-described fairness algorithm and satisfied conditions imply that given any node in the ring, the SAT signal will eventually arrive at that node. This, in turn, ensures that the fairness algorithm is kept stable and alive —a feature referred to as liveness.

A principle difference between a simple embedded ring and a tree embedded ring is that in the former ring a packet must travel over the entire portion of the ring between the entry and destination nodes of the ring, while in a tree embedded ring this is not necessary, and a packet can take short cuts to its destination. Short cuts occur when a packet is transmitted between virtual nodes of one physical node; and for example with reference to FIG. 8, a packet can take a short cut across physical node B, from virtual node $VN_2$ to virtual node $VN_4$. Once a packet has entered the ring, that packet will travel, with or without short cuts, until it reaches its destination node, where the packet is then removed from the ring.

With the above-discussed fairness algorithm, each virtual node is treated as an independent entity; and therefore, each virtual node receives its own transmission quota, and the transmission quotas of the different virtual nodes are not necessarily the same. As a result, physical node i with r virtual nodes will receive r transmission quotas. A transmission quota is given to a virtual node after the SAT signal traverses the physical node to which the virtual node belongs.

As previously mentioned, a link buffer, which can contain one maximum size data packet, is located on the output side of each link. As discussed below, when a node is determining from which of the buffers associated with the node to transmit data, the buffers of the thread links have a lower priority than the buffers of the ring links. To ensure that data packets do not overflow at the buffers of the thread links, the transmission of data —referred to as traffic—over the thread links is regulated by a control signal called send-one-packet. This signal is sent from the buffer of a thread link whenever an output transmission, and more specifically, the output transmission of a packet header, is started from the link buffer. This signal is sent to the input side of the thread link and each thread link can transmit a packet from its input side to its link buffer only after receipt of this send-one-packet signal. As a result, (i) at most, one packet header can be in any one thread link buffer at any given time, and (ii) data cannot overflow at a thread link buffer because the rate at which data is transmitted out of the buffer is greater than or equal to the rate at which data is transmitted over the thread link and into that buffer.

A data packet that arrives at an intermediate node —that is, a node between the entry and destination nodes of the packet—is preferably routed onto an outgoing link from that intermediate node that brings the data packet closer to its destination node. In order to ensure that a data packet is not held indefinitely in a buffer of a thread link, when a node forwards a SAT signal, all of the data packets currently held in the thread link buffers of that node are marked; and when the next SAT signal arrives at the node, this latter SAT signal will not be further forwarded by the node until all of the so-marked packets have been transmitted.

Several basic mechanisms are preferably used in the construction and operation of network 10. First, preferably the control signals are kept very short, and for instance, where possible, they are one byte long; and the control signals are provided with or carry local information and are exchanged between neighboring nodes. These signals are preferably sent between nodes without any queuing delay and may be inserted in an arbitrary position in the data packets, as discussed above. Second, the ring structures formed by the ring links of the network enable control functions that were developed for a ring structure —a regular structure—to be applied to network 10 regardless of its topology or structure.

Also, preferably, the ring structure that is formed in network 10 may be applied to any network topology, is easy to generate, and operates effectively despite the development of signal transmission faults in the network and despite changes in the topology of the underlying network. Moreover, the ring structure has a global sense of direction, and the control functions or signals that manage the various mechanisms are easy to implement and to distribute, or circulate, in the ring structure.

With reference again to FIG. 3, the switching or routing function of each node can be viewed as a service given to the input links of that node, by the switch controller or control unit; and the result of this service is that data packets are transferred from an incoming link j to an outgoing link k, or to or from the external host interface. Preferably, as previously mentioned, the packet transfer rate across the switch unit is equal to or greater than the rate of transmission of the data packets over the links of the network.

From a functional point of view, the switch is a bipartite graph with the same number of input and output vertices, which are connected to the incoming and outgoing links and to the external host interface. FIG. 3 illustrates a switch for node i and having $2d$ input vertices and $2d$ output vertices, where d is the degree of the node. The variable r represents the number of virtual nodes of node i and, therefore, the switch is connected to r input ring links and r output ring links. Also, node i is connected to d-r input thread links and to d-r output thread links, and the switch is connected to each of these input and output thread links.

The vertices $d+1$ to $2d$ of the switch are connected to the external host interface; and more specifically, each of these switch vertices is connected to a respective one vertex of the host interface. As a result, multiple packets can be transmitted to and from the host at the same time. The internal edge of the switch diagram shown in FIG. 3 describes connections between input and output links. Generally, each input link can be connected to each output link or to any vertex of the host input buffer, and each vertex of the host output buffer can also be connected to each output link. At any one time, though, each of the input and output vertices of the switch can have, at most, one internal connection. The switch controller of each node may be comprised of a conventional non-blocking interconnecting data transmission network.

The vector, $\vec{\Delta}^i$, referred to as the neighborhood of node i, consists of all of the virtual nodes that can be directly accessed from node i by traversing any one ring link or any one thread link the size of this vector is represented by the variable e; and, in the vector, the virtual nodes are arranged in an increasing order. Thus, for example, with reference to FIG. 8, $\vec{\Delta}^A = \{VN_2, VN_4, VN_6, VN_8, VN_{10}, VN_{12}, VN_{16}\}$ $\vec{\Delta}^B = \{VN_1, VN_3, VN_5, VN_7, VN_{11}\}$, and $\vec{\Delta}^D = \{VN_2, VN_4, VN_6, VN_8, VN_{10}\}$.

It should be noted that e will always be greater than or equal to d.

A function, $F_i^\Delta$ discussed below, is used to map the virtual nodes of the neighborhood of node i to the output links thereof by means of the node switch.

When a switch input j of node i receives a data packet, the switch will compute an input vector, $\vec{IL_j}$. This vector has e bits, and each bit of the vector corresponds to a respective one virtual node in the neighborhood of node i. The computation will assign a value of one to each of the bits of $\vec{IL_j}$ that correspond to virtual nodes that, in comparison to the virtual node of node i at which the packet arrived, are closer to the destination node of the packet.

The computation of $\vec{IL_j}$ uses the following parameters:

i) $\overrightarrow{DST}$, referred to as the packet destination vector, is the collection of the virtual nodes of the packet's destination node, ii) $\vec{\Delta}^i$ is the neighborhood vector of node i, and iii) $\vec{VN}^i$ is the logical name of node i.

When a packet arrives at its destination node, the input processing unit of that node will transmit, or switch, this packet to the corresponding external output to the input buffer of the host interface. If a packet arrives at a node that is not its destination node, then if a bit in the computed $\vec{IL_j}$ vector is set to 1, the packet can be routed to the virtual node that correspond to that bit by means of the link connected to that virtual node.

After computing $\vec{IL_j}$, the node processing unit will send a routing request message to the switch controller. Discussed below are two algorithms for computing these messages, one for computing the message when the data packet arrives at the node over a ring link, and a second for computing the message when the data packet arrives at the node over a thread link.

Figure 9:
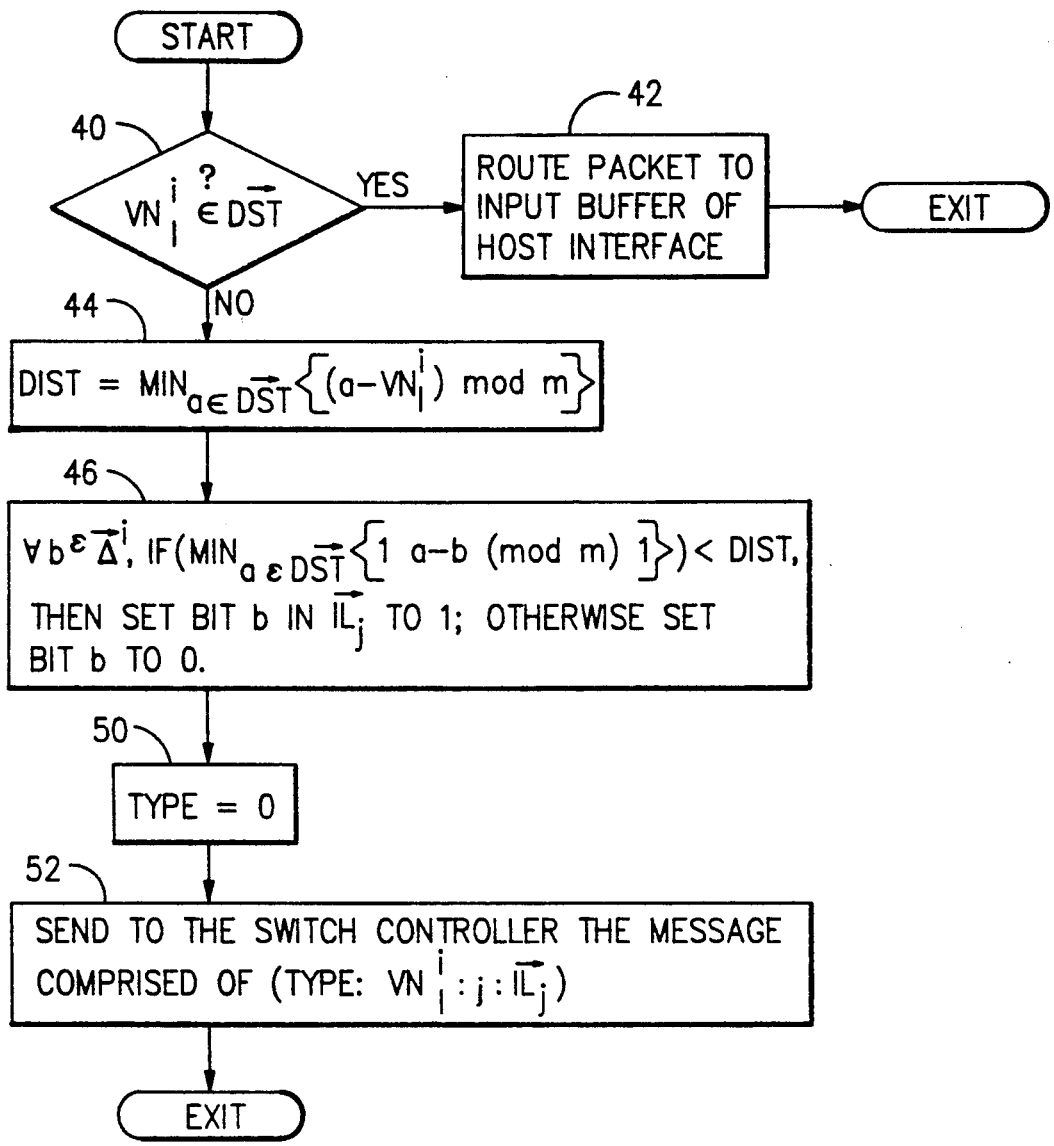
FIG. 9 is a flow chart illustrating an algorithm that is performed when a data packet arrives at a node over a first type of link.

With reference to FIG. 9, when a data packet arrives at node i over a ring link j, the node processor, at step 40, determines whether $VN_1^i$ is in the destination vector, $\vec{DST}$. If $VN_1^i$ is in $\vec{DST}$, then node i is the destination node for the data packet, and that packet is transmitted to the input buffer of the host interface via output link d+j, as indicated at step 42, and the processor then exits from the program.

If, however, $VN_1^i$ is not in $\vec{DST}$, then the program goes from step 40 to step 44 and calculates the variable DIST. This is done by setting DIST equal to the minimum of the values $\{(a - VN_1^i) \bmod m\}$, calculated for each element a in the set of $\vec{DST}$, and where m is the total number of virtual nodes in the global embedded ring of the network. In this calculation, "mod m" is defined by the following rule:

$(x-y) \bmod m = x-y$, if $x > y$, and $(x-y) \bmod m = \{m+x\} - y$, if $x \leq y$.

Also, the above-discussed equation for DIST is given in terms of the names, $VN_1^i$, of virtual nodes. When actually performing these calculations, the number that is substituted for the name of the virtual node is the numeric subscript in that name —that is, 1 would be substituted for $VN_1^i$. As so determined, DIST is the minimum distance, in terms of virtual nodes, between the destination node of the data packet, and the virtual node of node i at which the data packet arrived.

After DIST is calculated, the vector $\vec{IL_j}$ is calculated at step 46. There is a one-to-one correspondence between the elements of $\vec{\Delta^i}$ and $\vec{IL_j}$, and to determine each element of $\vec{IL_j}$, an intermediate value is first determined from the corresponding element of $\vec{\Delta^i}$. This intermediate value is the minimum value of $\{(a-b) \bmod m\}$, calculated for each element a in the set $\vec{DST}$, and where b is that corresponding element of $\vec{\Delta^i}$. Again, when actually performing these calculations, the numeric subscript in the name of a virtual node is substituted for the name of that virtual node in the equation. This intermediate value is then compared to DIST. If this intermediate value is less than DIST, then the corresponding element of $\vec{IL_j}$ is set equal to 1; and if this intermediate value is not less than DIST, then the corresponding element of $\vec{IL_j}$ is set equal to 0.

At step 50, the variable TYPE is set equal to 0, indicating that the data packet is from a ring link; and at step 52, the routing message, comprised of the variable TYPE, $VN_1^i$, j and $\vec{IL_j}$ is then sent to the switch controller. After this, the processor exits from the algorithm.

Figure 10:
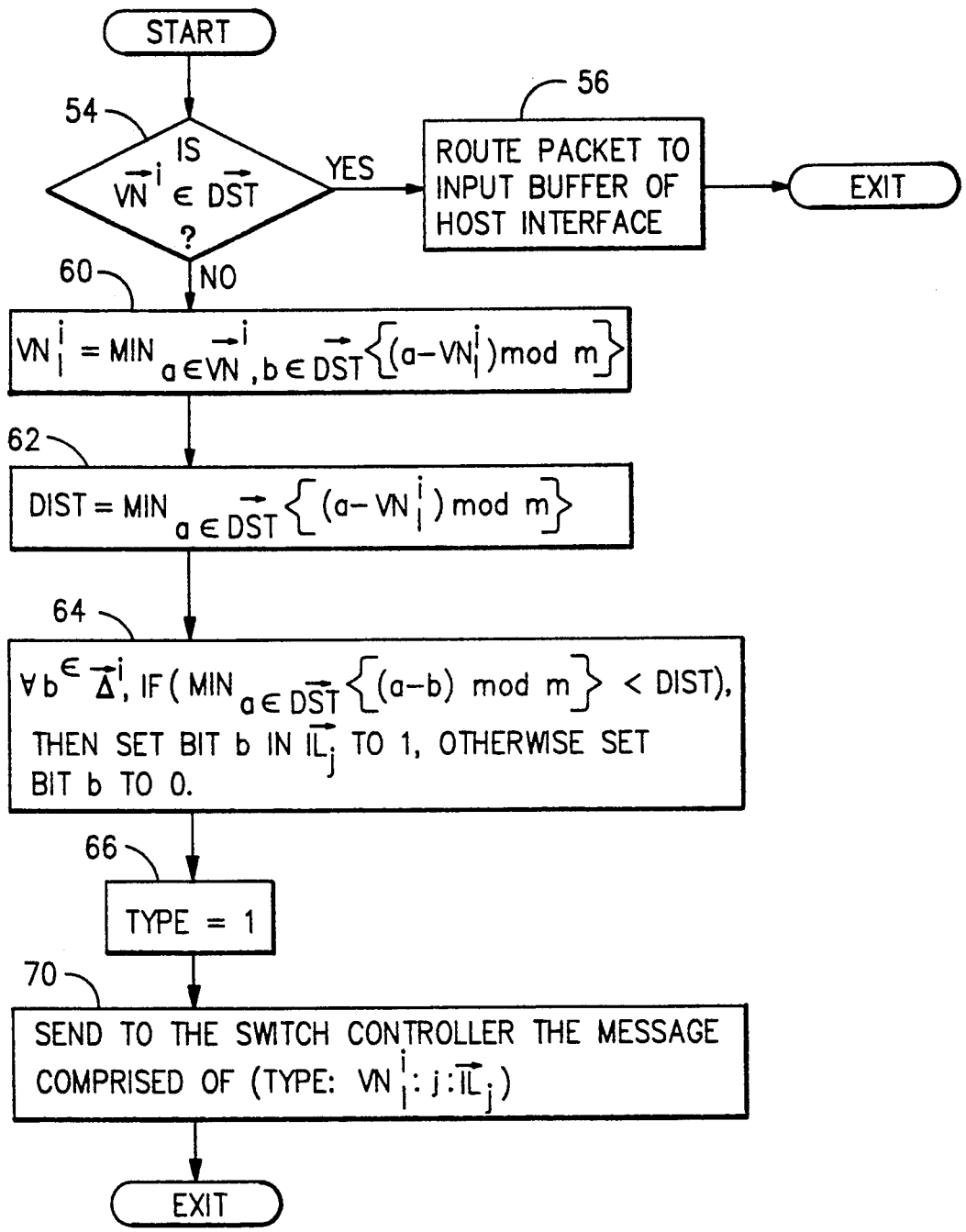
FIG. 10 is a flow chart showing an algorithm that is employed when a data packet arrives at a node over a second type of link.

With reference to FIG. 10, when a packet arrives at node i over a thread link j, the node processor, at step 54, first compares $\vec{VN^i}$ to the destination vector, $\vec{DST}$, of the packet. If these two vectors are the full equivalent of each other, then node i is the destination node for the packet, the packet is sent to the input buffer of the host interface via external output link d+j, as indicated at step 56, and then the processor exits from the algorithm.

If, though, at step 54, $\vec{VN^i}$ is not the full equivalent of $\vec{DST}$, the processor proceeds to step 60, which is to determine $VN_1^i$. This is done by setting $VN_1^i$ equal to the minimum of the values $\{(b-a) \bmod m\}$, calculated for each element a in the set of $\vec{VN^i}$ and for each element b in the set of $\vec{DST}$. In this way, $VN_1^i$ identifies the virtual physical node of node i that is the closest to the destination node of the packet. Then, at step 62, the variable DIST is set equal to the minimum of the values $\{(a - VN_1^i) \bmod m\}$, calculated for each element a in the set of $\vec{DST}$. Here also, when actually performing the calculations at steps 60 and 62, the number that is substituted for the name of a virtual node in the equation is the numeric subscript in that name.

After DIST is calculated, the vector $\vec{IL_j}$ is calculated at step 64. As mentioned above, there is a one-to-one correspondence between the elements of $\vec{\Delta^i}$ and $\vec{IL_j}$. To determine each element of $\vec{IL_j}$, an intermediate value is first determined from the corresponding element of $\vec{\Delta^i}$. This intermediate value is the minimum of all the values $\{(a-b) \bmod m\}$, calculated for each element a in the set DST, and where b is that corresponding element of $\vec{\Delta^i}$. This intermediate value is then compared to DIST. If this intermediate value is less than DIST, then the element of $\vec{IL_j}$ is set equal to 1; while if this intermediate value is not less than DIST, then the corresponding element of $\vec{IL_j}$ is set equal to 0. Again, when actually performing these calculations, the numeric subscript in the name of a virtual node is substituted for the name of that virtual node in the equation.

At step 66, the variable TYPE is set equal to one; and at step 70, the routing message, comprising the variables TYPE, $VN_1$, j and $\vec{IL_j}$, is then sent to the switch controller. The processor then exits from this algorithm.

Figure 6:

The switch controller receives the routing request message, either from the program of FIG. 6 or the program of FIG. 10, and employs a third algorithm to determine where to transmit the package associated with that message. This third algorithm uses the following variables.

i) $\vec{OUT}$—this vector has a respective one element, or bit, associated with each link connected to the node. If a link is busy, its associated bit in the $\vec{OUT}$ vector is set to 1; but if the link is not busy, its associated bit in the $\vec{OUT}$ vector is set to 0. Hence, generally, if the lth link to the node is idle or busy, the lth element of the OUT vector (represented by the notation $\vec{OUT}_l$) is 1 or 0, respectively.

ii) $\vec{OL_j}^1$—this vector has a respective one element, or bit, associated with each virtual node in $\vec{\Delta^i}$, and indicates which of those nodes can be reach directly from output link $OL_j$. If a virtual node can be reached, the associated bit in $\vec{OL_j}^1$ is set to 1, but if a virtual node cannot be so reached the associated bit in $\vec{OL_j}^1$ is set to 0.

iii) $\vec{OL_j}^0$—this vector is the complement of $\vec{OL_j}^1$. Thus, the vectors $\vec{OL_j}^0$ and $\vec{OL_j}^1$ have the same number of elements or bits; and if a bit of $\vec{OL_j}^1$ is 0 or 1, the corresponding bit of $\vec{OL_j}^0$ is 1 or 0, respectively.

iv) $\overrightarrow{MASK}$—this vector indicates the priority the ring traffic has to continue on the next ring link of the embedded ring. When a packet arrives at a node over a ring link j and the packet cannot be immediately routed by the switch controller, then the next link on the ring is masked; and as a result, data packets arriving at the node over other links cannot use the masked ring link. Initially, all of the bits in $\overrightarrow{MASK}$ are set to 1.

v) $\overrightarrow{AVAIL}$—this vector indicates the output links, or routes, that are available for a given request.

Figure 11:
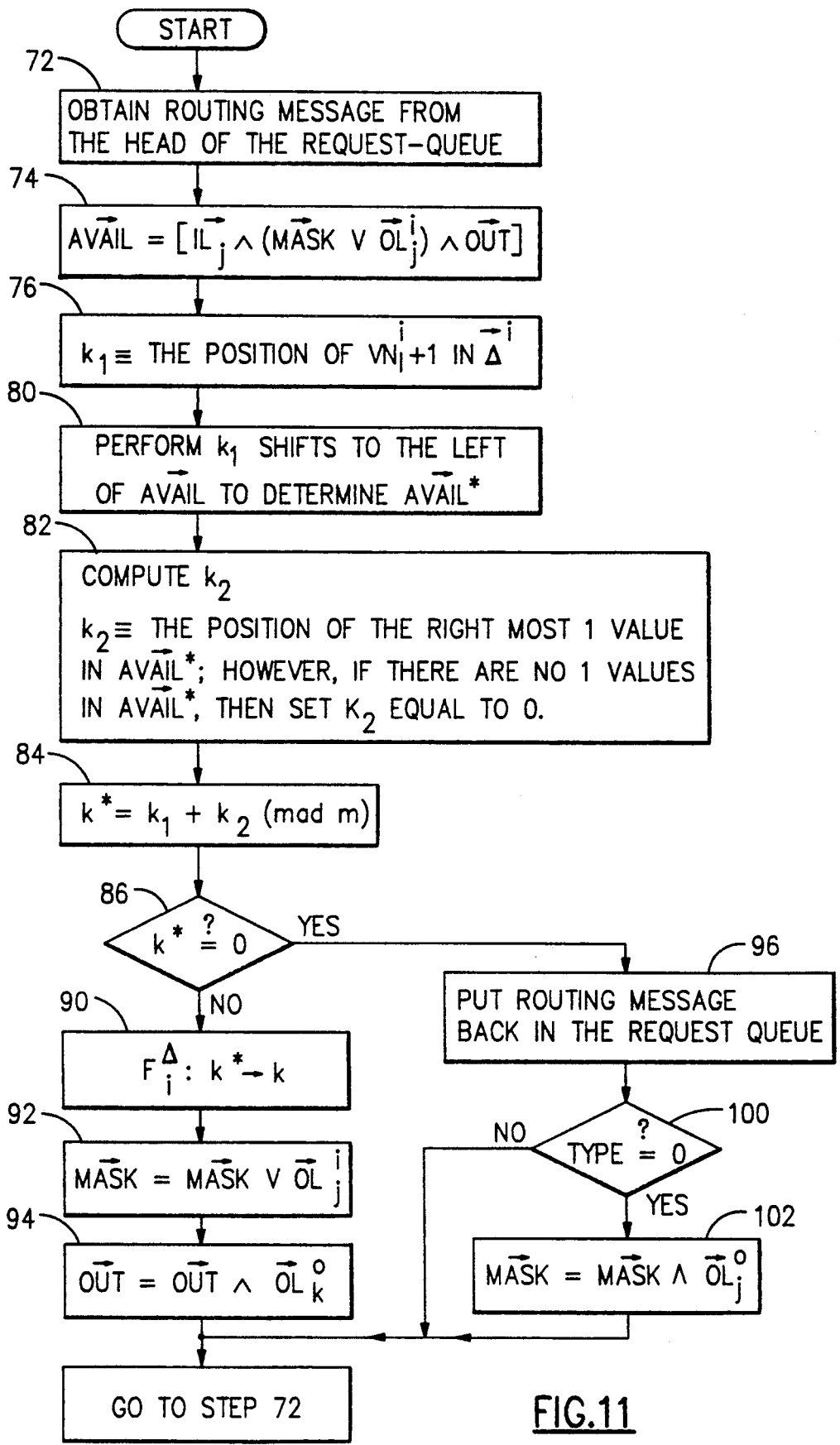
FIG. 11 shows a flow chart of a switching algorithm used to determine an output link for a data packet.

The switching algorithm is shown in FIG. 11. At step 72, the processor obtains the routing message from the head of the request-queue. This message consists of four variables, TYPE, $VN_1^i$, j, and $\overrightarrow{IL_j}$. At step 74, the vector $\overrightarrow{AVAIL}$ is set equal to the intersection of three sets, $\overrightarrow{IL_j}$, $\overrightarrow{OUT}$, and a third set which itself is a union of two sets, $\overrightarrow{MASK}$, and $\overrightarrow{OL_j^1}$. As so determined, the vector $\overrightarrow{AVAIL}$ identifies the virtual nodes that are currently available for routing the data packet from the set of possible virtual nodes in $\overrightarrow{IL_j}$.

The next steps in the switching algorithm are performed to determine the best available virtual node, represented by the symbol $VN_{k*}^i$, to which the packet should be switched; and this is done by determining the virtual node in the $k^{*th}$ position in $\overrightarrow{A^i}$. More specifically, at step 76, $k_1$ 80, $\overrightarrow{AVAIL^*}$ is determined; and this is done by performing $k_1$ circular shifts to the left of the elements of $\overrightarrow{AVAIL}$. Each time a circular shift is performed, the right most element of $\overrightarrow{AVAIL}$ is simply removed from that position and placed to the left of the left most element of the vector. Then, $k_2$ is computed at step 82. $k_2$ is the position of the most 1 value in $\overrightarrow{AVAIL^*}$. If there are no 1 values in $\overrightarrow{AVAIL^*}$, then $k_2$ is set equal to 0. Then, at step 84, $k^*$ is determined according to the equation: $k^* = (k_1 + k_2) \bmod e$; and then at step 86, $k^*$ is compared to 0.

If $k^*$ is not equal to 0, then a route that decreases the distance to the destination node is available; and the next step is to map the virtual node to the corresponding output link. This is done, at step 90, by the rule: $F_j^A$: $k^* \to k$. The function $F_j^A$ simply identifies the output link, k, connected to the virtual node $k^*$. Then, at step 92, $\overrightarrow{MASK}$ is reset to the union of the current $\overrightarrow{MASK}$ vector and and $\overrightarrow{OL_j^1}$; and at step 94, $\overrightarrow{OUT}$ is reset to the intersection of the current $\overrightarrow{OUT}$ and $OL_k^0$. After this, the program returns to step 72 and repeats.

If at step 86, $k^*$ is equal to 0, then a route that decreases the distance to the destination node is not available; and if this is the case, the routing message is put back in the request queue at step 96. Then, at step 100, TYPE is compared to 0; and if TYPE equals 0 (which means that the packet came to the node over a ring link), then, at step 102, $\overrightarrow{MASK}$ is reset to the intersection of the current $\overrightarrow{MASK}$ and $\overrightarrow{OL_j^0}$. This is done so that, in case this data packet was transmitted to the node over a ring link, the next available link in the embedded ring is reserved for the transmission of this packet.

After step 102, or after step 100 if TYPE is not equal to 0, the program returns to step 72 and processes the next routing message in the request queue. Also, after the switch controller completes the transmission of a packet to an outgoing link, $OL_k$, the controlle that link available for other packets by resetting $\overrightarrow{OUT}$ to the union of the current $\overrightarrow{OUT}$ and $\overrightarrow{OL_k^1}$.

To better understand the operation of the present invention and in particular, the algorithms shown in FIGS. 9-11, several specific examples of these algorithms are discussed below.

Figure 12:
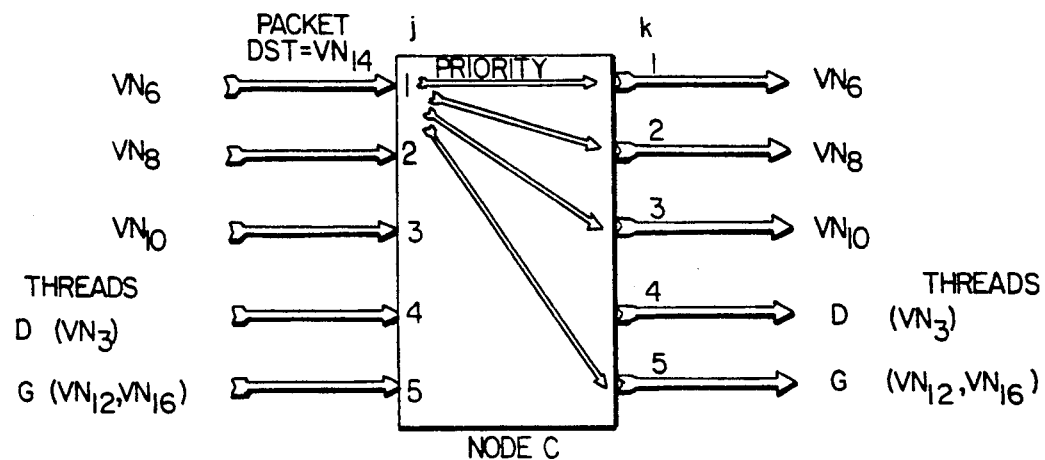
FIG. 12 diagrammatically illustrates a switching process at a node.
Figure 13:
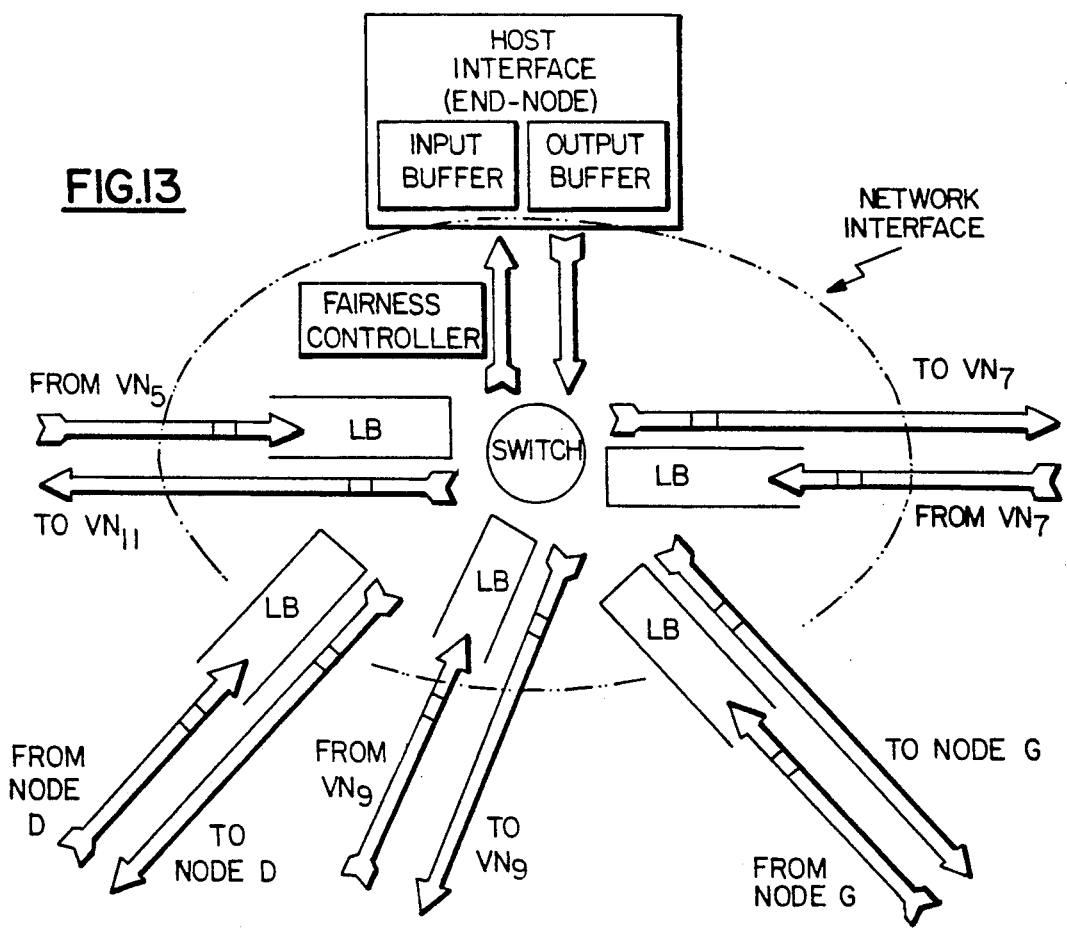
FIG. 13 schematically shows the structure of the node illustrated in FIG. 12.

As a first example, with reference to FIGS. 8, 12, and 13, a data packet whose destination is virtual node $VN_{14}$ arrives at switching node C over a ring link such as the link connected to virtual node $VN_6$. This data packet can be switched to virtual nodes $VN_6$, $VN_8$, or $VN_{10}$ or to the thread links leading to nodes D or G.

Because this data packet arrives over a ring link, the algorithm shown in FIG. 9 is utilized. In this example, $VN_1^i = 5$ and $\overrightarrow{DST} = \{VN_{14}\} = \{14\}$; and because $VN_1^i$ is not equal to $\overrightarrow{DST}$, DIST is calculated. There is only one value in $\overrightarrow{DST}$, so $DIST = (14 - 6) \bmod 16 = 8$.

The next step is to compute $\overrightarrow{IL_j}$. The neighborhood vector, $\overrightarrow{A^i}$, of node C is $\{1, 3, 5, 7, 9, 11, 12, 16\}$; and because a $= 14$ and $DIST = 8$, then $\overrightarrow{IL_j} = \{0,0,0,1,1,1,1,0\}$. Also, TYPE = 0, and the message (0, 6, 1,{0,0,0,1,1,1,1,0}) is sent to the switch controller.

The computer is very similar when a data packet arrives at a node over a thread link, however, in this case, the data packet is considered as if it had arrived at the node via the virtual node thereof that is closest to the destination node of the data packet. This virtual node is determined at step 60 of the algorithm shown in FIG. 10.

More specifically, as a second example, a data packet whose destination is virtual node $VN_{14}$, arrives at switching node C over a thread link, such as the link form node D. In this case, again, $VN^i = 6$ and $DST = \{14\}$; and because these two values are not equal, the algorithm proceeds to step 60 and determine $VN_1^i$ as follows:

$$VN_i' = \min_{a \in \{6,8,10\}, b \in \{14\}} \{(b - a) \bmod 16\}$$
$$= \min \{(14 - 6) \bmod 16, (14 - 8) \bmod 16,$$
$$(14 - 10) \bmod 16\}$$
$$= \min \{8, 6, 4\} = 4$$

Steps 62, 64, 66, and 70 of the algorithm of FIG. 10 are performed in the same manner as steps 44, 46, 50, and 52 of the algorithm of FIG. 9, except of course, that in step 66, TYPE is set equal to 1.

As a third example, the message computed above according to the algorithm of FIG. 9 is processed by the switch controller according to the algorithm of FIG. 11. At step 74 of this latter algorithm, $\overrightarrow{AVAIL}$ is computed according to the equation:

$$\overrightarrow{AVAIL} = [\overrightarrow{IL_j} (\overrightarrow{MASK} \lor \overrightarrow{OL_j}) \overrightarrow{OUT}]$$

All of the vectors in this equation have the same number of elements, and all of these elements are either 0 or 1. Moreover, the number of elements in each of these vectors is the same as the size of the neighborhood of node C, which is 8. Generally, the $\overrightarrow{AVAIL}$ computation identifies the subset of virtual nodes in the neighborhood of Node C that are currently available for routing; that is, the physical links to this subset of virtual nodes are not busy.

Initially, all the bits, or elements, of $\overrightarrow{MASK}$ are set to 1. However, a bit in this vector is set to 0 to represent or identify a virtual node in the neighborhood of node C that is being reserved for another data packet being held at node C. As an example, assume that another data packet had previously arrived at node C via virtual node $VN_8$; and that this other data packet should be routed to virtual node $VN_9$, but that this couse not be done because the physical link to that virtual node was busy. To insure that priority is given to this other data packet to continue on the outgoing ring link to virtual node $VN_9$, the bit in $\overrightarrow{MASK}$ that represents or corresponds to that outgoing ring link is set to 0. Thus, $\overrightarrow{MASK} = \{1,1,1,1,0,1,1,1\}$.

The elements of $\overrightarrow{OL_j^i}$ are normally zeros; however 1 values are located in the positions of this vector that correspond to the virtual nodes to which the data packet under consideration itself has routing priority. In this example, the data packet at $VN_6$ has priority to virtual node $VN_7$, and thus $\overrightarrow{OL_j^i} = \{0,0,0,1,0,0,0,0\}$. Each element of the binary vector $\overrightarrow{OUT}$ is zero if the physical link to the corresponding virtual node is currently busy, and each element of this vector is one if the physical link to the corresponding virtual node is currently busy. In our example, the physical links to nodes G and H will be considers as busy, and the physical links to nodes D, E and A will be considered as not busy. Thus $\overrightarrow{OUT} = \{1,1,1,0,0,1,0,0\}$.

With the above vector values, $\overrightarrow{AVAIL}$ is computed as follows.

$$\begin{aligned}\overrightarrow{AVAIL} &= [\overrightarrow{IL_j} \wedge (\overrightarrow{MASK} \vee \overrightarrow{OL_j^i}) \wedge \overrightarrow{OUT}] \\ &= \{0,0,0,1,1,1,0\} \\ &\quad \wedge (\{1,1,1,1,0,1,1,1\} \vee \{0,0,0,1,0,0,0,0\}) \\ &\quad \wedge \{1,1,1,0,0,1,0,0\} \\ &= \{0,0,0,1,1,1,1,0\} \wedge \{1,1,1,1,0,1,1,1\} \\ &\quad \wedge \{1,1,1,0,0,1,0,0\} \\ &= \{0,0,0,0,0,1,0,0\}\end{aligned}$$

Thus, the only routing possible is over the physical link to the virtual node, $VN_{11}$, which corresponds to the sixth element in the $\overrightarrow{AVAIL}$ vector.

The next step is to determine the best available virtual node, and this is done by selecting the virtual node represented by or corresponding to the element of $\overrightarrow{AVAIL}$ that is the greatest distance from the current position of the data packet. To do this $k_1$ is computed. $k_1$ is the current position of the virtual node $VN_{6+1}$ in the neighborhood vector $\overrightarrow{\Delta^i}$. $VN_7$ is in the fourth position from the left in $\overrightarrow{\Delta^i}$, and thus $k_1 = 4$. $\overrightarrow{AVAIL^*}$ is next obtained by performing four circular shifts to the left to $\overrightarrow{AVAIL}$, and hence $\overrightarrow{AVAIL^*} = \{0,1,0,0,0,0,0,0\}$. Next, $k_2$ is computed, and this is done by determining the position of the right most 1 value in $\overrightarrow{AVAIL^*}$. In our example, $k_2 = 2$.

The next steps of the algorithm of FIG. 11 are done to determine the actual position in $\overrightarrow{\Delta^i}$ of the best available virtual node. $k^*$ is first calculated according to the equation: $k^* = k_1 + k_2 \pmod{e}$. In this equation, e is the number of elements in $i$, which is eight. Thus in our example, $k^* = 4 + 2 \pmod 8 = 6$. The sixth position in $\overrightarrow{\Delta^i}$ is occupied by $VN_{11}$, and thus this is the best available virtual node.

After this, at step 90 of FIG. 11, the physical link to this virtual node is determined. Preferably, this is done by means of a look-up table, and the data packet is then switched onto that physical link. Then, $\overrightarrow{MASK}$ is updated. If the data packet was forwarded from a ring link and a particular virtual mode, then a 1 value is placed in the $\overrightarrow{MASK}$ element that corresponds to the virtual node that is next to that particular virtual node in $\overrightarrow{\Delta^i}$. Thus, $\overrightarrow{MASK} = \overrightarrow{MASK} \vee \overrightarrow{OL_j^i}$. The $\overrightarrow{OUT}$ vector is also updated by setting to 0 all of the elements thereof that correspond to the virtual nodes in the neighborhood vector $\overrightarrow{\Delta^i}$ that can be reached by the physical link determined at step 90. In our example, the updated $\overrightarrow{OUT} = \{0,1,0,0,0,0,0,0\}$.

After this, the switch controller returns to step 72 to serve another routing request.

The switching process described above has several significant advantages. First, an advantage referred to as safety, is that a packet cannot be lost in the network due either to a collision with another packet over a switch or due to overflow of a link buffer. This advantage can be shown by analyzing the life of a data packet in the network. First, a collision over a switch cannot occur because each output link of a node can be connected to only one input link of a node at a time —that is, the allocation of the node output links is atomic—and because each packet is switched from an input link to an output link only after the switching of the previous packet is completed.

Further, a data packet cannot be lost by overflow of a ring link buffer for several reasons. First, each ring link buffer is capable of containing one maximum size packet, and the ring links form a buffer insertion ring, as discussed above. Second, the transmission of a packet from a ring link is given priority over the transmission of a packet from a thread link. A data packet cannot be lost due to overflow of a thread link buffer because the above-discussed control signal send-one-packet, ensures that, at most, one packet header can be in a thread link buffer at a time. Finally, a packet loss cannot occur as a result of the transmission of data packets from the network to a host interface since each switch can atomically route data packets from all input links of the node to the host interface at the same time without interference.

A second advantage of the above-discussed switching process, referred to as liveness, is that a packet residing in a link buffer will always leave that buffer —that is, the packet will not die in the buffer. This advantage can be demonstrated by analyzing the two possible cases: (i) a data packet arrives at a node over a ring link and is stored in the buffer of a ring link, and (ii) a data packet arrives at a node over a thread link and is stored in the buffer thereof.

A packet that arrives at a node over a ring link will normally be routed by the switch controller to the best available output link connected to that node. If no output link is available when the packet arrives at the node, an output link will be marked to reserve it for the packet. Once the marked link completes its current transmission, the waiting data packet will be transmitted over this link, unless a better, unmarked link had become available in the meantime, in which case, the packet is transmitted over this better link.

A packet will not be held forever in the buffer of a thread link because of the above-discussed fairness mechanism. As a result of this mechanism, when a SAT signal is forwarded from a first node to a second node, all of the data packets in the buffers of the thread links of the first node are marked. When the SAT signal next arrives at that first node, that signal will be held at that node until all of the marked data packets in the thread link buffers are sent. Also, as long as one node holds the SAT signal, none of the other nodes of the network will receive any new packet transmission quotas, and eventually all of these nodes will become idle. Further, the node currently holding the SAT signal will not receive any additional data packets, and thus all of the data packets held at that node can eventually be transmitted.

It can also be shown that the SAT signal will eventually arrive at each node. To elaborate, any node holding the SAT signal will eventually be satisfied, and thus this node will eventually forward the SAT signal to another node, which will, in turn, eventually forward this signal to still another node. Because each node of the network is traversed by the virtual ring, and this forwarding of the SAT signal continues, the SAT signal will eventually arrive at all of the nodes in the network.

The above-discussion shows that the fairness mechanism on a buffer insertion ring with thread links, ensures that the data packets are all eventually transferred and that the SAT signal will continuously circulate around the network. Thus, it can be concluded that the data transmission, or traffic, over the network is deadlock free.

A third important advantage of the switching process discussed above, and referred to as convergence, is that all the packets entering the network always reach their destination nodes, traversing each link at most once. This is a result of the facts that, first, the routing decisions made at each node are strictly based on improving the DIST variable, and second, the underlying embedded structure is a ring over a connected network. Thus, a data packet is always routed such that its distance from its destination node, as measured over the ring, is decreased, and there is always a path (which is at least as short as DIST) from the node at which a packet is currently located to the destination node for the packet.

Preferably, networks 10 and 12 are fault-tolerant and self-stabilized. For instance, thread-link failures are completely transparent to the system operation. In case of a failure of a node or a ring link, preferably an alternative thread connection is found that bypasses the failed node or ring link. In addition, preferably the nodes of the network will remove from the network any packet that is detected by a node as travelling away from the packet's destination node. Hence, even if the destination node fails to remove a packet, that packet will travel at most only one additional link before being removed from the network. Other fault-tolerant mechanisms are known, and can be added to the architecture of the present invention, by those of ordinary skill in the art.

While it is apparent that the invention herein disclosed is well calculated to fulfill the objects previously stated, it will be appreciated that numerous modifications and embodiments may be devised by those skilled in the art, and it is intended that the appended claims cover all such modification and embodiments as fall within the true spirit and scope of the present invention.

Having thus described our invention, what we claim as new, and desire to secure by letters patent is:

1. In a communication network having a multitude of switching nodes and a multitude of links interconnecting the nodes to transmit data packets therebetween, each link connecting together two of the nodes to transmit data packets in first and second opposite directions between said two nodes, a subset of said links forming a virtual ring embedded in said network and traversing each of the nodes thereof at least once, and wherein in said virtual ring each of said subset of links is traversed in each of said directions at most once, a method comprising:

the nodes routing each data packet to a destination node thereof without requiring any data from the data packet other than data indentifying the destination node of the data packet, the routing step including the step of the nodes routing each data packet to the destination node thereof so that the distance, along said virtual ring, between the data packet and the destination node thereof always decreases; and the nodes determining, from data in each data packet that identifies the destination node of the data packet, a set of links over which the data packet is transmitted to said destination node.

2. A method according to claim 1, wherein another subset of the links form thread links providing connections between nodes of the virtual ring, and the step of routing each data packet to another node includes the step of selectively routing data packets from one of the links of the virtual ring onto one of the thread links to reduce the number of links of the virtual ring traversed by the data packets.

3. In a communication network having a multitude of switching nodes and a multitude of links interconnecting the nodes to transmit data packets therebetween, each link connecting together two of the nodes to transmit data packets therebetween, a subset of said links forming a virtual ring embedded in said network and traversing each of the nodes thereof at least once, and wherein in said virtual ring each of said subset of links is traversed at most once, a method comprising:

the nodes routing each data packet to a destination node thereof such that the distance, along said virtual ring, between the data packet and the destination node thereof always decreases; and the nodes determining, from data in each data packet that identifies the destination node of the data packet, a set of links over which the data packet is transmitted to said destination node.

4. A method according to claim 3, wherein said subset of links comprise input and output links; at least one pair of input and output links is connected to each node; at each node, each pair of input and output links connected to the node form a virtual node; and at least selected ones of the nodes includes a plurality of virtual nodes; and wherein: the routing step includes the step of, at each of the selected nodes, selectively transmitting data packets arriving at the selected node at one of the virtual nodes thereof, to another of the virtual nodes of the selected node to reduce the number of links of the virtual ring traversed by the data packets.

5. A method according to claim 4, wherein:

the routing step further includes the step of numbering the virtual nodes in sequence in a given direction around the virtual ring; and the transmitting step includes the steps of, for each data packet arriving at the selected node,
  i) determining the available virtual node of the selected node closest in the numbered sequence to any one of the virtual nodes of the destination node of the data packet, and
  ii) transmitting the data packet to the determined virtual node.

6. A method according to claim 5, wherein the data packets have a maximum size, and each input link connected to each node has a respective one buffer for holding the data packets, and further comprising the step of:

holding, at most, one maximum size data packet in any one of the buffers at any one time.

7. A method according to claim 3, wherein at least one pair of links of said subset of links is connected to each node, another subset of the links comprise thread links, each thread link connecting together two of the nodes to transmit data therebetween outside of the virtual ring, and wherein:

the routing step includes the step of, at each of selected nodes, selectively transmitting data packets arriving at the selected node over one of the links of the virtual ring, onto a thread link connected to the selected node.

8. In a communication network having a multitude of switching nodes and a multitude of links interconnecting the nodes to transmit data packets therebetween, each link connecting together two of the nodes to transmit data packets therebetween, a first subset of said links forming a virtual ring embedded in said network and traversing each of the nodes thereof at least one, and wherein in said virtual ring, each link of the first subset of links is traversed at most once, each link of said first subset of links forms an output link from one of the nodes and an input link of another of the nodes, each node has at least one pair of input and output links, and each pair of input and output links of each node forms a virtual node of said each node; a second subset of said links forming thread links, each of the thread links connecting together two of the nodes to transmit data therebetween outside of the virtual ring, a method comprising:

transmitting data packets around the network over the ring links and the thread links; and each node switching data packets transmitted to the node over one of the links, onto another of the links connected to the node, and including the step of each node assigning a higher switching priority to data packets transmitted to the node over an input link of a virtual node of said each node, to continue on to the output link of said virtual node of said each node, than to data packets transmitted to said each node over one of the thread links or another input link of said each node.

9. A method according to claim 8, further including the step of:

the nodes routing each data packet to a destination node thereof without requiring any data from the data packets other than data indentifying the destination node of the data packet.

10. A method according to claim 9, wherein the data packets have a maximum size, and each of the links has a respective one buffer for holding the data packets, and further including the step of:

holding, at most, one maximum size data packet in any one of said buffers at any one time.

11. A communication network, comprising:

a multitude of nodes for transmitting data packets between the network and a multitude of user stations, and for routing the data packets around the network, each data packet having an entry node and a destination node; and a multitude of links interconnecting the nodes to transmit data packets therebetween, each link connecting together two of the nodes to transmit data between said two nodes, a subset of said links forming an embedded virtual ring traversing each of the nodes of the network at least once, and wherein, in said virtual ring, each of said subset of links is traversed in each of said directions at most once; wherein each of said subset of links forms an output link from one of the nodes and an input link of another of the nodes, and each node has at least one pair of input and output links;

wherein the nodes include means to route each data packet to a destination node thereof without requiring any data from the data packet other than data identifying the destination node of the data packet; and the means to route each data packet includes means to determine, from data in each data packet that identifies the destination node of the data packet, a set of links over which the data packet is transmitted to said destination node.

12. A communication network according to claim 11, wherein:

the routing means includes a multitude of switching means, each of the nodes including a respective one of the switching means;

at each node, the switching means thereof routes each data packet transmitted to the node to another node so that the distance, along the virtual ring, between the data packet and the destination node thereof always decreases.

13. A communication network according to claim 12, wherein:

another subset of the links form thread links for transmitting data packets between the nodes and outside of the virtual ring; and the switching means of at least selected ones of the nodes includes means to selectively route data packets from one of the links of the virtual ring onto one of the thread links to reduce the number of links traversed by the data packets.

14. A communication network, comprising:

a multitude of nodes for transmitting data packets between the network and a multitude of user stations, and for routing the data packets around the network, each data packet having an entry node and a destination node; and a multitude of links interconnecting the nodes is transmit data packets therebetween, each link connecting together two of the nodes to transmit data packets therebetween, a subset of said links forming a virtual ring embedded in the network and traversing each of the nodes of the network at least once; wherein each of the subset of links forms an output link from one of the nodes and an input link of another of the nodes, and each node has at least one pair of input and output links;

wherein the nodes include means to route each data packet to a destination node thereof such that the distance along said virtual ring, between the data packet and the destination node thereof always decreases; and the means to route each data packet includes means to determine, from data in each data packet that identifies the destination node of the data packet, a set of links over which the data packet is transmitted to said destination node.

15. A communication network according to claim 14, wherein:

at each node, each of said pair of input and output links of the node forms a virtual node;

at least selected ones of the nodes include a plurality of virtual nodes; and the routing means includes a multitude of switching means, each of the nodes including a respective one of the switching means;

the switching means of each of at least selected ones of the nodes includes means to selectively transmit data packets arriving at the selected node at one of the virtual nodes thereof, onto another of the virtual nodes of the selected node to reduce the number of links of the virtual ring traversed by the data packets.

16. A communication network according to claim 15, wherein:
the virtual nodes of the network are numbered in sequence in a given direction around the virtual ring; and the switching means of the selected nodes includes means to identify the virtual node of the selected node having the lowest number in said sequence, and to transmit the data packet to said identified virtual node.

17. A communication network according to claim 16, wherein:
the data packet have a maximum size; and each input link of each node has a respective one buffer capable of holding, at most, one maximum size data packet.

18. A communication network according to claim 14, wherein:
another subset of the links comprise thread links, each of the thread links connecting together two of the nodes to transmit data therebetween outside of the virtual ring;
the routing means includes a multitude of switching means, each of the nodes including a respective one of the switching means;
the switching means of each of at least selected ones of the nodes includes means to selectively transmit data packets arriving at the selected node over a ring link, onto a thread link connected to the selected node.

19. A communication network, comprising:
a multitude of nodes for transmitting data packets between the network and a multitude of user stations, and for routing the data packets around the network, each data packet having an entry node and a destination node; and
a multitude of links interconnecting the nodes to transmit data packets therebetween, each link connecting together two of the nodes to transmit data packets therebetween, a first subset of said links forming a virtual ring embedded in said network and traversing each of the nodes thereof at least once, and wherein, in said virtual ring, each of the first subset of links is traversed at most once, a second subset of said links forming thread links connecting together two of the nodes to transmit data therebetween outside of the virtual ring;
wherein each link forms an output link from one of the nodes and an input link of another of the nodes, and each node has at least one pair of input and output links;
each node including switching means to switch each data packet transmitted to the node to an output link thereof, the switching means of at least selected nodes assigning a higher switching priority to data packets transmitted to a virtual node over a ring link to continue on the outgoing ring link from the virtual node, than to data packets transmitted to the selected node over one of the thread links or other ring links.

20. A communication network according to claim 19, wherein:
the data packets have a maximum size; and
each input link of each node has a respective one buffer capable of holding, at most, one maximum size data packet.

21. A communication network according to claim 20, wherein the switching means of the nodes route each data packet to a destination node thereof without requiring any data from the data packets other than data identifying the destination node of the data packet.

* * * * *

UNITED STATES PATENT AND TRADEMARK OFFICE
CERTIFICATE OF CORRECTION

PATENT NO. : 5,297,137
DATED : March 22, 1994
INVENTOR(S) : Yoram Ofek, et al.

It is certified that error appears in the above-indentified patent and that said Letters Patent is hereby corrected as shown below:

On the Title Page, in the Abstract, line 3: after "topology" insert --.--

Column 1, line 19: after "network" insert --.--
Column 2, line 7: "mode" should read --node--
Column 2, line 34: after "thereof" insert --.--
Column 3, line 48: after "1991," delete --filed--
Column 6, line 22: "a t" should read --at--

Column 13, line 27: after "k" insert --is computed. $k_1$ is the position of ($VN_{i+1}$) in $\vec{\Delta}^i$. At step--

Column 13, line 34: "the most" should read --the right most--

Column 13, line 64: "controlle" should read --controller--

UNITED STATES PATENT AND TRADEMARK OFFICE
CERTIFICATE OF CORRECTION

PATENT NO. : 5,297,137
DATED : March 22, 1994
INVENTOR(S) : Yoram Ofek, et al.

It is certified that error appears in the above-indentified patent and that said Letters Patent is hereby corrected as shown below:

Column 20, line 35, Claim 14: "is" should read --to--

Signed and Sealed this

Eleventh Day of October, 1994

BRUCE LEHMAN

*Attest:*

*Attesting Officer*  *Commissioner of Patents and Trademarks*

UNITED STATES PATENT AND TRADEMARK OFFICE
CERTIFICATE OF CORRECTION

PATENT NO. :   5,297,137
DATED       :   March 22, 1994
INVENTOR(S) :  Yoram Ofek, et al.

It is certified that error appears in the above-indentified patent and that said Letters Patent is hereby corrected as shown below:

Column 14, line 11:   "=5"   should read ---=6--

Signed and Sealed this

Twenty-first Day of March, 1995

Attest:

BRUCE LEHMAN

*Attesting Officer*     *Commissioner of Patents and Trademarks*